Patented Dec. 16, 1947

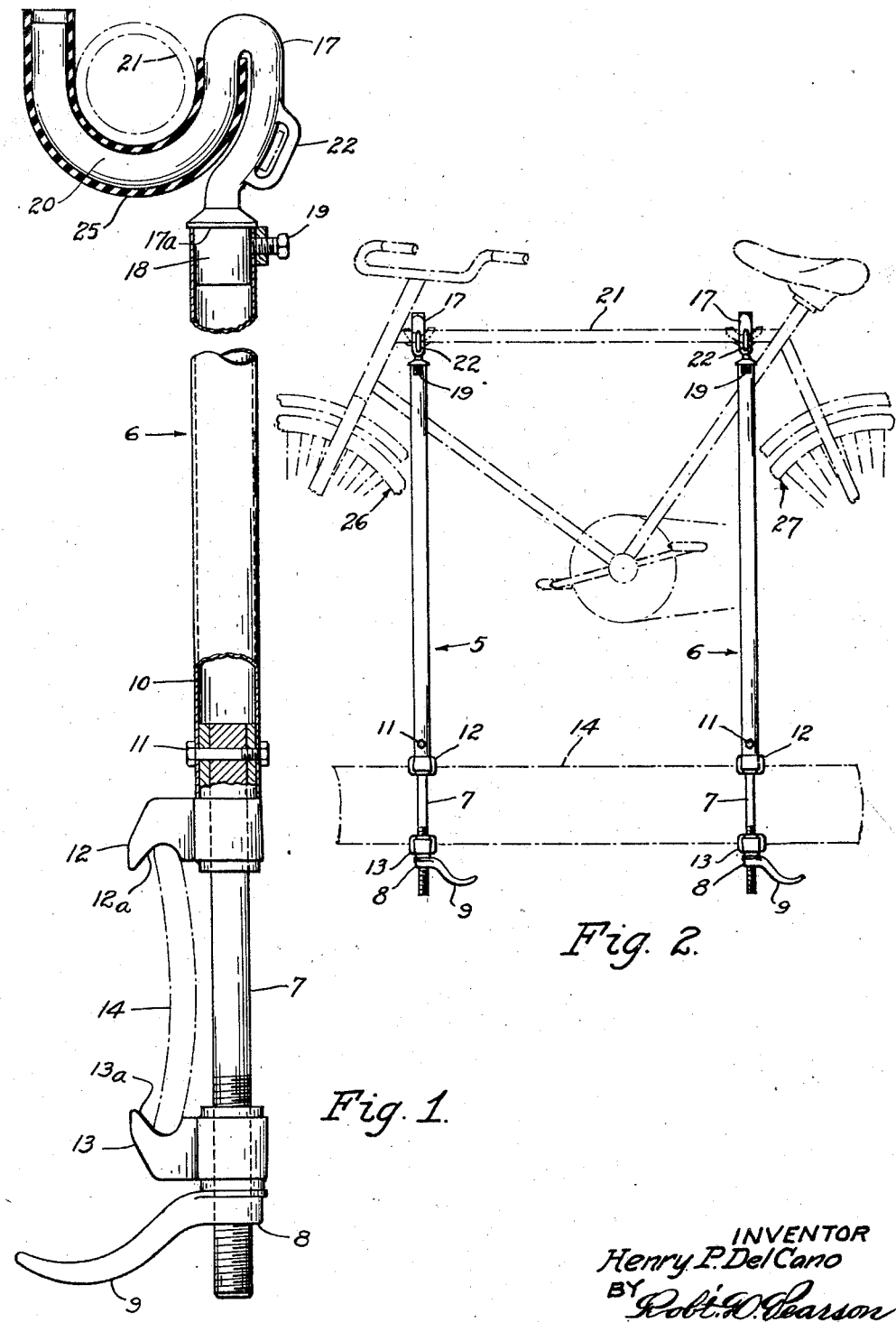

2,432,732

UNITED STATES PATENT OFFICE 2,432,732

DEVICE FOR SUPPORTING BICYCLES ON AUTOMOBILE BUMPERS

Henry P. Del Cano, Los Angeles, Calif.

Application March 12, 1946, Serial No. 653,744

5 Claims. (Cl. 224—29)

1

This invention relates to a device for supporting bicycles on automobile bumpers.

Among the objects of the invention are: to provide a simplified hanger structure which is clampable to either the front or the rear bumper of an automobile and which has seat portions safely to support the bicycle by underlying its horizontal top bar, so that the bicycle will lie close to the automobile; to provide a bicycle support of the above stated character which, when not in use can be collapsed so as to occupy a very small amount of storage space; and to provide the device with superior means for powerfully gripping the bumpers to which it is attachable so that vibrations of swiftly traveling vehicles provided with the attachment will not dislodge it from its mounted position.

Other objects, advantages and features of invention will hereinafter appear.

Referring to the accompanying drawing, which illustrates what is at present deemed to be a preferred embodiment of the invention, Fig. 1 is a side elevation of the device illustrating its attached relation to a bumper and to a bicycle frame. In this view parts are shown in vertical section and an intermediate part is broken out in order to contract the length of the view.

Fig. 2 is a front elevation of the structure shown in Fig. 1.

Referring in detail to the drawing, a pair of twin elongated hanger members 5 and 6 are shown each of which comprises a base bar 7 which is screwthreaded throughout its lower end portion to have screwed onto it a nut 8 furnished with a handle 9. The upper end of said bar 7 is telescoped tightly into the lower end of a sleeve 10, a bolt 11 here passing through the hanger to retain said bar and sleeve in a fixed relation to each other.

Before the handled nut 8 is screwed onto the bar 7 an apertured upper clamping lug 12 and like lower clamping lug 13 are loosely slipped in place upon said bar so as to be utilized to grip between them the bumper 14. The lug 12 is furnished in its lower side with a recess 12a to fit over the upper edge of said bumper, and the lower lug 13 has in its upper side a recess 13a to afford a seat for the lower edge of said bumper.

A saddle member 17 is provided for each of the hangers 6 and 7, said member having a cylindrical shank 18 fitted within the upper end portion of the sleeve 10 and secured therein by a setscrew 19, said shank being surrounded with a peripheral stop flange 18a where it joins the body portion of the saddle member 17. This saddle member is shown as consisting of a short bar the outer end portion of which is bent into a U-shaped part 20 to receive and support the top bar 21 of a bicycle. Said saddle 17 has a handle loop 22 to aid the user in applying each hanger of the device to the frame of the bicycle.

A tubular cushioning sleeve 25 is shown around the part 20, said sleeve being applied to keep the bicycle bar 21 from being marred.

When the complete device is mounted upon a vehicle bumper 14 the front wheel 26 of the bicycle will be positioned adjacent to one side of the automobile and the rear bicycle wheel 27 adjacent to the opposite side thereof and the intermediate portion of the frame of the bicycle will hang close to the inner sides of the hangers 5 and 6.

It will be observed that adjacent to the portion of the rod which forms the saddle member is deflected in relation to the axis of said shank and that as a result, the U-shaped, saddle-forming part of the rod is shifted to a position more nearly in alinement with the axis of said shaft than would otherwise be the case. This arrangement causes the bicycle to be supported closer to the automobile bumper which is an advantage in its support.

I claim:

1. In a device of the kind described, a hanger structure comprising a base bar having a screwthreaded end portion, a sleeve into one end portion of which the opposite end portion of said bar is inserted, means securing said bar to said sleeve in said inserted position, a pair of apertured clamping lugs through the apertures of which said bar loosely extends to support said lugs in engagement with opposite edge portions of a bumper, a clamping nut to screw onto said threaded portion of said bar to clamp said lugs against the bumper by pressing against the lowermost lug, the uppermost of said lugs at such time abutting against that end of said sleeve into which said bar extends, and means carried by said sleeve to support a bicycle, said clamping lugs each having a bumper engaging recess, said recesses facing toward each other.

2. In a device of the kind described, a pair of hanger members provided with means for clamping them to an automobile bumper in upstanding, horizontally spaced apart positions, each of said hangers having an upper sleeve portion, and bars bent to form seats for the horizontal top bar of a bicycle, said bent bars having shanks secured within the upper part of said sleeve portions, and tubular cushions telescoped over said bent seat forming portions of the bars.

3. In a device of the kind described, an elongated hanger structure comprising a sleeve which forms an intermediate portion thereof, said sleeve being in an upstanding position, clamping means to secure the device to the bumper of an automobile, said clamping means including a bar the upper end portion of which is secured within the lower end portion of said sleeve when the device is in its mounted position, and a saddle member to engage and support a bicycle, said saddle member having a shank securable in the upper end portion of said sleeve when the device is in its mounted position.

4. In a bicycle carrier of the kind described, hanger means clampable in an upstanding position to a bumper and comprising a sleeve which is directed upwardly when the device is clamped to the bumper; and a rod comprising an end portion forming a shank securable in the upwardly directed end of said sleeve, a portion next to said shank being deflected toward one side of the axis of the latter, and a remaining portion bent to a U-shape being shifted closer to alinement with the axis of said shaft by reason of the portion of the rod which is adjacent to said shank being deflected as aforesaid.

5. In a device of the kind described, a pair of disconnected hanger members provided with means for clamping them to an automobile bumper in upstanding, horizontally spaced apart positions, each of said hangers having an upper extension means, and bars bent to form seats for the horizontal top bar of a bicycle, said bent bars being secured to the upper part of said extension means.

HENRY P. DEL CANO.

REFERENCES CITED

The following references are of record in the file of this patent:

UNITED STATES PATENTS

| Number | Name | Date |
| --- | --- | --- |
| 2,379,994 | Schwinn | July 10, 1945 |

FOREIGN PATENTS

| Number | Country | Date |
| --- | --- | --- |
| 93,243 | Sweden | Nov. 11, 1938 |
| 96,775 | Sweden | Sept. 5, 1939 |